(12) United States Patent
Ryan et al.

(10) Patent No.: US 11,598,435 B2
(45) Date of Patent: Mar. 7, 2023

(54) STOP/CHECK/EXPANSION PLUG VALVE

(71) Applicant: Parker-Hannifin Corporation, Cleveland, OH (US)

(72) Inventors: John A. Ryan, Necedah, WI (US); Gregory A. Edgar, Tomah, WI (US)

(73) Assignee: Parker-Hannifin Corporation, Cleveland, OH (US)

( * ) Notice: Subject to any disclaimer, the term of this patent is extended or adjusted under 35 U.S.C. 154(b) by 502 days.

(21) Appl. No.: 16/571,290

(22) Filed: Sep. 16, 2019

(65) Prior Publication Data

US 2020/0355414 A1 Nov. 12, 2020

Related U.S. Application Data

(60) Provisional application No. 62/844,832, filed on May 8, 2019.

(51) Int. Cl.
| | | |
|---|---|---|
| *F16K 15/18* | (2006.01) | |
| *F25B 41/20* | (2021.01) | |
| *F25B 41/31* | (2021.01) | |
| *F25B 41/24* | (2021.01) | |
| *F16K 5/10* | (2006.01) | |

(Continued)

(52) U.S. Cl.
CPC ............ *F16K 15/182* (2021.08); *F16K 15/18* (2013.01); *F16K 15/184* (2021.08); *F25B 41/20* (2021.01); *F25B 41/24* (2021.01); *F25B 41/31* (2021.01); *F16K 5/0407* (2013.01); *F16K 5/10* (2013.01); *F16K 15/025* (2013.01); *Y10T 137/7936* (2015.04)

(58) Field of Classification Search
CPC . F16K 1/54; F16K 3/267; F16K 15/18; F16K 15/182; F16K 15/184
See application file for complete search history.

(56) References Cited

U.S. PATENT DOCUMENTS

| | | | | |
|---|---|---|---|---|
| 695,378 A | * | 3/1902 | Cowles | F16K 15/026 74/18.2 |
| 1,101,933 A | * | 6/1914 | Hough | F16K 1/02 251/276 |

(Continued)

FOREIGN PATENT DOCUMENTS

| | | |
|---|---|---|
| CN | 104896155 | 9/2015 |
| CN | 104989853 | 10/2015 |
| GB | 682344 | 11/1952 |

*Primary Examiner* — Robert K Arundale
*Assistant Examiner* — Richard K. Durden
(74) *Attorney, Agent, or Firm* — Renner, Otto, Boisselle & Sklar, LLP

(57) ABSTRACT

A valve for a refrigeration system includes a valve body, a guide seat arranged in the valve body, a piston plug that has a metering slot and is axially movable relative to the guide seat to open and close the valve, and an adjustable valve stem that is axially movable to engage the piston plug. The piston plug is movable between a closed position in which the piston plug is seated against the guide seat and engaged with the valve stem to prevent fluid flow through the valve, a metering position in which the piston plug is moved away from the guide seat and engaged with the valve stem to enable a predetermined amount of forward fluid flow through the valve, and a check valve position in which the piston plug is seated against the guide seat to prevent reverse fluid flow through the valve.

17 Claims, 6 Drawing Sheets

(51) Int. Cl.
*F16K 5/04* (2006.01)
*F16K 15/02* (2006.01)

(56) References Cited

U.S. PATENT DOCUMENTS

| | | | |
|---|---|---|---|
| 1,146,723 A | 7/1915 | Losh | |
| 1,582,938 A * | 5/1926 | Smith | F16K 15/18 251/83 |
| 2,516,825 A * | 7/1950 | Hejduk | F16K 1/52 251/122 |
| 2,880,750 A * | 4/1959 | Amison, Jr. | F16K 1/422 137/469 |
| 2,980,392 A * | 4/1961 | Greenwood | F16K 1/52 251/210 |
| 3,420,493 A * | 1/1969 | Kraft | F16K 15/18 251/82 |
| 3,511,470 A * | 5/1970 | Beckett | F16K 1/52 251/121 |
| 3,511,475 A * | 5/1970 | Thomas | F16K 1/36 251/333 |
| 3,556,137 A * | 1/1971 | Billeter | F16K 21/00 137/543.15 |
| 3,707,987 A * | 1/1973 | Gordon | F16K 15/18 251/83 |
| 4,362,027 A * | 12/1982 | Barbier | G05D 23/1931 62/197 |
| 5,255,712 A | 10/1993 | Foster | |
| 5,586,745 A * | 12/1996 | Knapp | F16K 1/54 251/121 |
| 6,926,249 B2 * | 8/2005 | Erickson | F16K 1/54 251/122 |
| 7,328,593 B2 * | 2/2008 | Wiwe | F25B 41/20 62/527 |
| 2005/0276700 A1 | 12/2005 | Hirota | |
| 2014/0130917 A1* | 5/2014 | Lively | F16K 1/54 137/798 |

\* cited by examiner

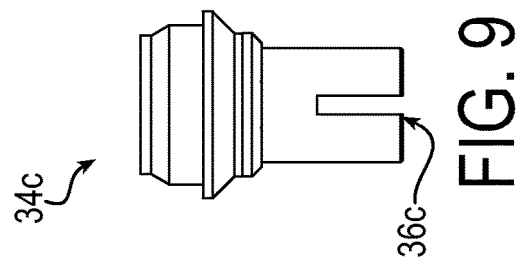
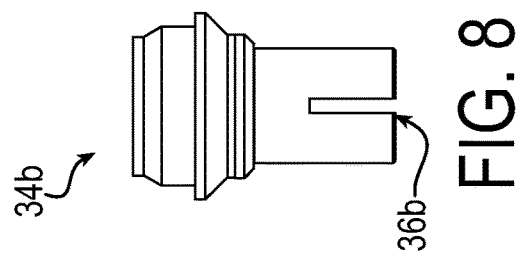
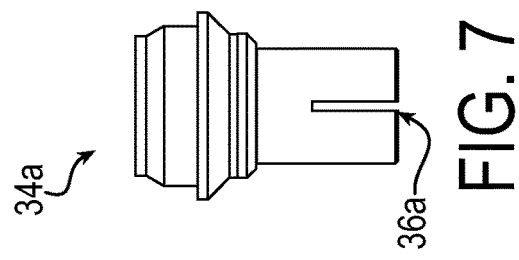
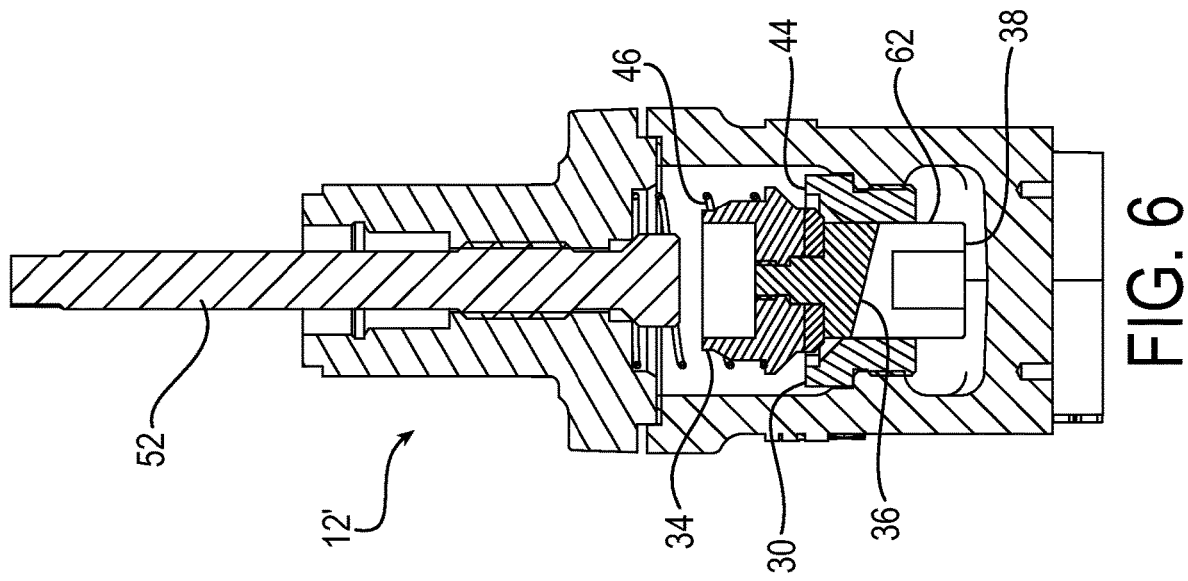

STOP/CHECK/EXPANSION PLUG VALVE

FIELD OF INVENTION

The present invention relates to refrigeration valves and more particularly to a multiport valve.

BACKGROUND

Refrigeration systems typically include different valves for controlling fluid flow in the system during the refrigeration cycle. Conventional refrigeration valves may be deficient in enabling stoppage of all flow, such as when repairs are performed on downstream equipment in the system. Conventional refrigeration valves may also be deficient in accommodating different flow demands that are required in a refrigeration system. Prior attempts to provide improved refrigeration valves are deficient in that the system may use many different valves to perform different flow control functions, or valves having many different moving parts to perform different flow control functions, such that the production and operational costs for the refrigeration system may be high.

SUMMARY OF INVENTION

The present invention is directed towards a valve, a valve assembly including the valve, and a method of controlling fluid flow using the valve for a refrigeration system. More particularly, the present invention is directed to a multiport valve that is configured for different operational states in which the valve may prevent forward fluid flow through the valve, prevent reverse fluid flow through the valve, and control an amount of fluid flow through the valve. The valve includes a guide seat, a piston plug that is movable relative to the guide seat and includes a metering slot formed in the piston plug, and an adjustable valve stem that is engageable with the piston plug to limit movement of the piston plug. The valve may be arranged as part of a valve assembly with additional valves, or as a stand-alone valve. The piston plug and the guide seat are formed to be removable relative to the other valve components such that the plug and the guide seat are replaceable without disrupting the rest of the valve components.

During normal forward fluid flow through the valve, pressurized fluid is applied against the piston plug, and the piston plug is moved away from the guide seat. Travel of the piston plug is limited by the valve stem being in a preset position to enable a predetermined amount of forward fluid flow through the valve. The position of the valve stem is adjustable to enable low, medium, and high amounts of forward fluid flow. The valve is also modular in that a piston plug having a metering slot corresponding to a particular amount of flow may be selected from a plurality of different piston plugs having different metering slots for a particular application.

When the valve is no longer pressurized and residual fluid pressure remains in the valve, the fluid pressure pushes the piston plug against the guide seat to prevent reverse fluid flow through the valve, such that the valve effectively acts as a check valve. In an exemplary application in which the valve is part of a valve assembly, the valve may be arranged downstream relative to a solenoid valve and a shutoff valve that remain open. Thus, the valve prevents fluid from flowing to the upstream valves. When the valve is closed, the piston plug is biased against the guide seat by a spring. The valve stem is then moved to engage against the piston plug when the piston plug is engaged against the guide seat, ensuring that the valve is tightly closed in a leak-free manner.

Using the plug assembly and the guide seat enables the valve to be a "three-in-one" valve that is configured to seal off flow, adjust flow by metering, and prevent reverse fluid flow through the valve, as compared with conventional refrigeration systems in which separate valves may be provided to perform each function. In a configuration in which the valve is arranged as part of a valve assembly, using the valve enables all of the functions to be performed at one port or station of the valve assembly. The valve uses fewer moving parts as compared with conventional refrigeration valves such that the valve is efficient and economical in controlling fluid flow.

According to an aspect of the invention, a valve includes a valve body, a guide seat arranged in the valve body, a piston plug that has a metering slot and is axially movable relative to the guide seat to open and close the valve, and an adjustable valve stem that is axially movable to engage the piston plug. The piston plug is movable between a closed position in which the piston plug is seated against the guide seat and engaged with the valve stem to prevent fluid flow through the valve, a metering position in which the piston plug is moved away from the guide seat and engaged with the valve stem to enable a predetermined amount of forward fluid flow through the valve, and a check valve position in which the piston plug is seated against the guide seat to prevent reverse fluid flow through the valve.

According to another aspect of the invention, a valve assembly includes a multiport valve having a valve body, a guide seat arranged in the valve body, a piston plug that has a metering slot and is axially movable relative to the guide seat, and an adjustable valve stem that is axially movable to engage the piston plug. The valve assembly includes a solenoid valve fluidly connected to the multiport valve and a shutoff valve that is fluidly connected to the solenoid valve and fluidly connected between the multiport valve and the shutoff valve. When the shutoff valve is closed and the solenoid valve is closed, the piston plug is movable to a closed position in which the piston plug is seated against the guide seat and engaged with the valve stem to prevent fluid flow through the multiport valve. When the shutoff valve is open and the solenoid valve is open, the piston plug is movable to a metering position in which the piston plug is moved away from the guide seat and engaged with the valve stem to enable a predetermined amount of forward fluid flow through the multiport valve, and a check valve position in which the piston plug is seated against the guide seat to prevent reverse fluid flow through the multiport valve.

According to still another aspect of the invention, a method of controlling fluid flow in a multiport valve includes setting a position of a valve stem to enable a predetermined amount of flow through the multiport valve, supplying a pressurized fluid to a piston plug to move the piston plug away from a guide seat and against the valve stem, with the movement of the piston plug opening a metering slot of the piston plug to enable the predetermined amount of flow, moving the piston plug against the guide seat when pressurized fluid is no longer supplied to the piston plug to prevent reverse fluid flow through the multiport valve, and adjusting the position of the valve stem to engage the piston plug when the piston plug is seated against the guide seat to close the multiport valve.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

FIG. 6 is a drawing showing a sectional view of the multiport valve of FIG. 1 in a stand-alone configuration.

FIG. 7 is a drawing showing a side view of a piston plug of the multiport valve of FIG. 1 with a metering slot according to an exemplary embodiment.

FIG. 8 is a drawing showing a side view of a piston plug of the multiport valve of FIG. 1 with a metering slot according to another exemplary embodiment.

FIG. 9 is a drawing showing a side view of a piston plug of the multiport valve of FIG. 1 with a metering slot according to still another exemplary embodiment.

DETAILED DESCRIPTION

Aspects of the present invention relate to valves used in refrigeration systems, and more particularly to a multiport valve. The multiport valve may be a stand-alone valve or arranged in a valve assembly that includes a plurality of fluidly interconnected valves. Using the single multiport valve is advantageous in that the valve configuration enables three different operational states for controlling fluid flow through the valve. The valve is operable as a hand valve in which the valve is closed to seal off fluid flow through the valve, a check valve in which the valve prevents reverse fluid flow through the valve, and an expansion valve in which an amount of fluid flow through the valve is metered. The multiport valve uses fewer moving components as compared with conventional refrigeration valves such that the multiport valve described herein is a more efficient and economical valve.

Figure 1:
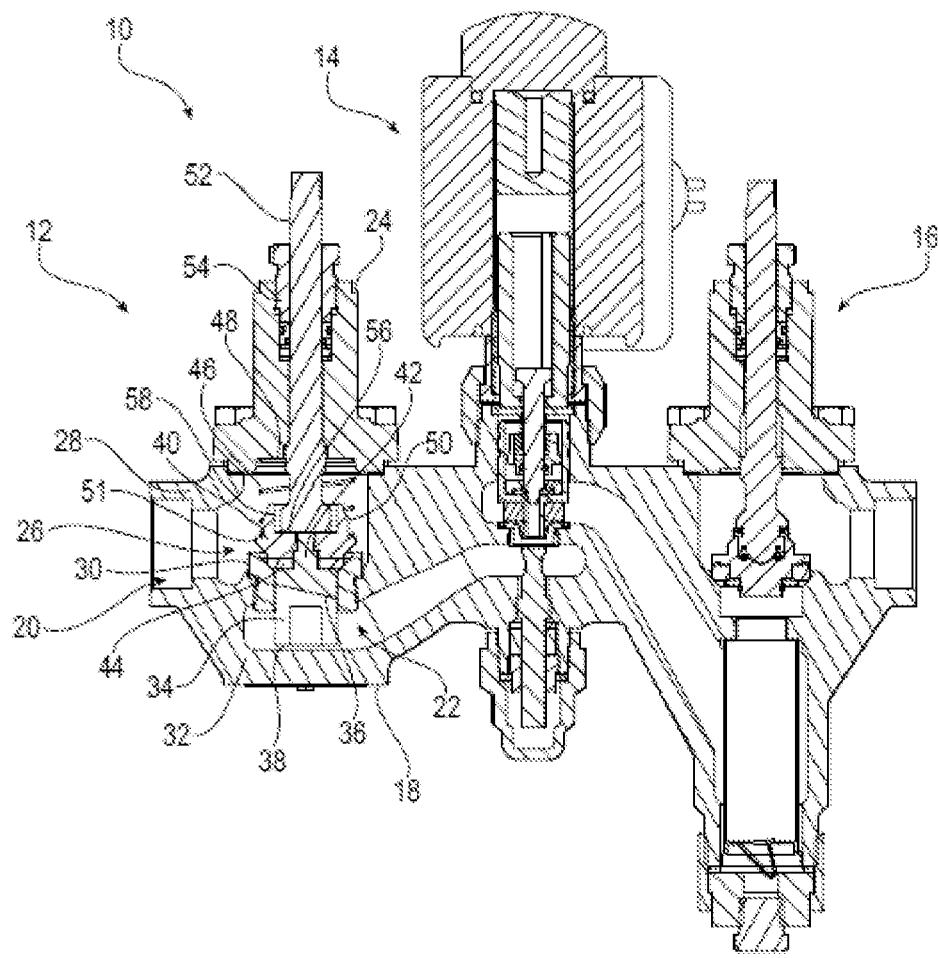
FIG. 1 is a drawing showing a sectional view of a valve assembly having a multiport valve, a solenoid valve, and a shutoff valve that are each in a closed position.

Referring first to FIG. 1, a valve assembly 10 is shown. The valve assembly 10 may be arranged in a refrigeration circuit for a refrigeration system and is suitable for liquid or gaseous fluid flow. The valve assembly 10 includes a multiport valve 12, a solenoid valve 14, and a shutoff valve 16 that are fluidly connected to each other. In an exemplary embodiment, the solenoid valve 14 is fluidly connected between the multiport valve 12 and the shutoff valve 16. The valves 12, 14, 16 are arranged such that each valve forms approximately a third of the entire valve assembly 10. The valves 12, 14, 16 may be housed in a single and integral valve body, or each valve may have a separate valve body that is connectable to the other valve bodies when the valve assembly 10 is assembled. In an exemplary application, the multiport valve 12 may be downstream of the solenoid valve 14 which is downstream of the shutoff valve 16. More or fewer valves may be provided in the assembly.

FIG. 1 shows the shutoff valve 16 in a closed position such that fluid is not flowing through the valve assembly 10 including the multiport valve 12. The multiport valve 12 includes a valve body 18 that defines a first fluid port 20 and a second fluid port 22. Fluid flows through the multiport valve 12 between the first fluid port 20 and the second fluid port 22. The ports 20, 22 may be fluid inlets or outlets, and the direction of fluid flow through the ports 20, 22 may be dependent on an operational mode of the multiport valve 12. As shown in FIG. 1, the first fluid port 20 may be downstream relative to the second fluid port 22. The first fluid port 20 may be an outlet port for the valve assembly 10 such that fluid flows from the shutoff valve 16, through the solenoid valve 14, and then through the multiport valve 12. The second fluid port 22 is fluidly connected to the solenoid valve 14. In other exemplary applications in which the multiport valve 12 is a stand-alone valve, the second fluid port 22 may be fluidly connected to another valve or component of the refrigeration system.

The multiport valve 12 further includes a bonnet 24 that is removably attached to the valve body 18 to enclose a fluid chamber 26 extending between the first fluid port 20 and the second fluid port 22. The bonnet 24 may be attached to a first part 28 of the valve body 18. In an exemplary application in which the multiport valve 12 is horizontally mounted and in a vertically extending orientation, the first part 28 of the valve body 18 may be an upper or top part of the valve body 18. The multiport valve 12 may be arranged in any suitable orientation such that the bonnet 24 is attached to a left or right side of the valve body 18, or a lower or bottom part of the valve body 18. The orientation of the multiport valve 12 may be dependent on the application.

An annular guide seat 30 is arranged in the fluid chamber 26 and removably attached to a second part 32 of the valve body 18. The annular guide seat 30 may be fastened to the valve body 18 using any suitable fastening mechanism. The second part 32 of the valve body 18 may be a lower part of the valve body 18, and the first part 28 and the second part 32 of the valve body 18 may together define the fluid ports 20, 22 therebetween. The annular guide seat 30 is opened and closed to enable or prevent fluid communication between the fluid ports 20, 22. Any suitable material may be used to form the annular guide seat 30. Metal, such as steel, may be a suitable material. Advantageously, the annular guide seat 30 is removably separable relative to the rest of the components in the multiport valve 12 such that the seat is easily replaceable when the seat is worn or damaged, without disrupting the rest of the components in the valve.

An expansion or piston plug 34 is also arranged in the valve body 18 and is axially movable within the fluid chamber 26 relative to the annular guide seat 30. As shown in FIG. 1, when the shutoff valve 16 is closed and fluid is not moving through the valve assembly 10, the piston plug 34 is normally biased against the annular guide seat 30. When the shutoff valve 16 is open and fluid flows through the valve assembly 10, the piston plug 34 is moveable to control the amount of fluid flow through the multiport valve 12. Different forward fluid flow demands during normal operation of the multiport valve 12 are accommodated using a metering slot 36 formed in the piston plug 34. In an exemplary application, the piston plug 34 and the annular guide seat 30 may be used to accommodate the expansion of a refrigerant in a particular application.

The metering slot 36 may have any suitable shape, and the shape may be dependent on the amount of flow required for a particular application of the multiport valve 12. The metering slot 36 may be cut or milled into the piston plug 34 and have a tapered shape. The piston plug 34 may be cylindrical in shape and the tapered shape may be tapered along a diameter of the piston plug 34. Similarly to the annular guide seat 30, the piston plug 34 may be removably separable relative to the rest of the components in the multiport valve 12 such that the plug is easily replaceable when the plug is worn or damaged, without disrupting the rest of the components in the valve.

The piston plug 34 may be formed of two or more parts that are secured to each other for movement together. In other exemplary embodiments, the piston plug 34 may be formed as a single integral part. Any suitable material may be used to form the two parts, such as steel or another metal material. A first part of the piston plug 34 may be a lift cavity portion 38 that is formed to enable lifting the plug 34. The lift cavity portion 38 may accommodate different weight constraints within the refrigeration system. A second part of the piston plug 34 may be a spring-engaging portion 40 that is axially spaced relative to the lift cavity portion 38 and movable to open and close the annular guide seat 30. The piston plug 34 may include an axially protruding portion 42 that extends from the lift cavity portion 38 toward the bonnet 24 along a longitudinal axis of the piston plug 34. The spring-engaging portion 40 may be radially secured around the axially protruding portion 42 such that the lift cavity portion 38 and the spring-engaging portion 40 move together. A plastic annular seat 44 may be axially interposed between the two parts 38, 40 and surround the axially protruding portion 42. The plastic annular seat 44 is also removable. During operation, the plastic annular seat 44 is engageable against the metal annular guide seat 30. Any suitable plastic material may be used to form the plastic annular seat 44, such as a fluoropolymer material including a polytetrafluoroethylene (PTFE) material.

A biasing member or spring 46 is arranged between the bonnet 24 and the piston plug 34. The spring 46 biases the piston plug 34 in a normally closed position in which the piston plug 34 is engaged against the annular guide seat 30 to close the multiport valve 12 and prevent fluid flow through the valve, such as when the shutoff valve 16 is closed as shown in FIG. 1. In an exemplary application in which the multiport valve 12 is arranged in the vertically extending orientation, the spring 46 may engage or press against a lower or bottom portion 48 of the bonnet 24 and against sides 50 of the piston plug 34. The sides 50 of the piston plug 34 may have a shape that is formed to accommodate the spring 46. For example, the sides 50 have a curvature with radially extending protrusions or ribs 51 for ensuring engagement with the spring 46. The configuration of the multiport valve 12 provides for a floating-type movement of the piston plug 34.

The spring 46 also radially surrounds an adjustable valve stem 52 that is positioned in the bonnet 24. The adjustable valve stem 52 axially extends through the bonnet 24 and is movable through the bonnet 24 for controlling an amount of fluid flowing through the multiport valve 12. The valve stem 52, the piston plug 34, and the guide seat 30 may be arranged along a common longitudinal axis. The axial adjustment of the valve stem 52 may be performed manually, such as by an operator of the multiport valve 12, or in other exemplary embodiments, the axial adjustment may be performed automatically by a machine based on operational requirements of the system. The axial position of the valve stem 52 is set to a desired position, and the valve stem 52 is then fixed in the desired position using any suitable locking mechanism 54. For example, the locking mechanism 54 may include screws, nuts, bolts, plugs, clamps, or other suitable fasteners. Using the valve stem 52 is advantageous in that the position of the valve stem 52 may be set to many different axial positions for varying the amounts of fluid flow.

The valve stem 52 has a plug end 56 which is engageable with the piston plug 34 to control the amount of force being applied to the piston plug 34. The spring-engaging portion 40 of the piston plug 34 may define a recess 58 in which the plug end 56 of the valve stem 52 is received. The axially protruding portion 42 of the piston plug 34 may extend through the spring-engaging portion 40 to the recess 58 such that the plug end 56 engages against the axially protruding portion 42 when the plug end 56 is fully inserted in the recess 58 and against the piston plug 34. During operation, the valve stem 52 is adjusted to a first axial position that is spaced slightly away from the piston plug 34 to enable flow through the multiport valve 12, such as a fluid flow that is between 0.15 and 0.40 times the maximum rated flow rate of the valve when fully open. When the multiport valve 12 is closed to prevent fluid through the valve, the valve stem 52 is adjusted to another axial position against the piston plug 34 when the piston plug 34 is seated against the annular valve seat 30 for sealing the valve.

Figure 2:
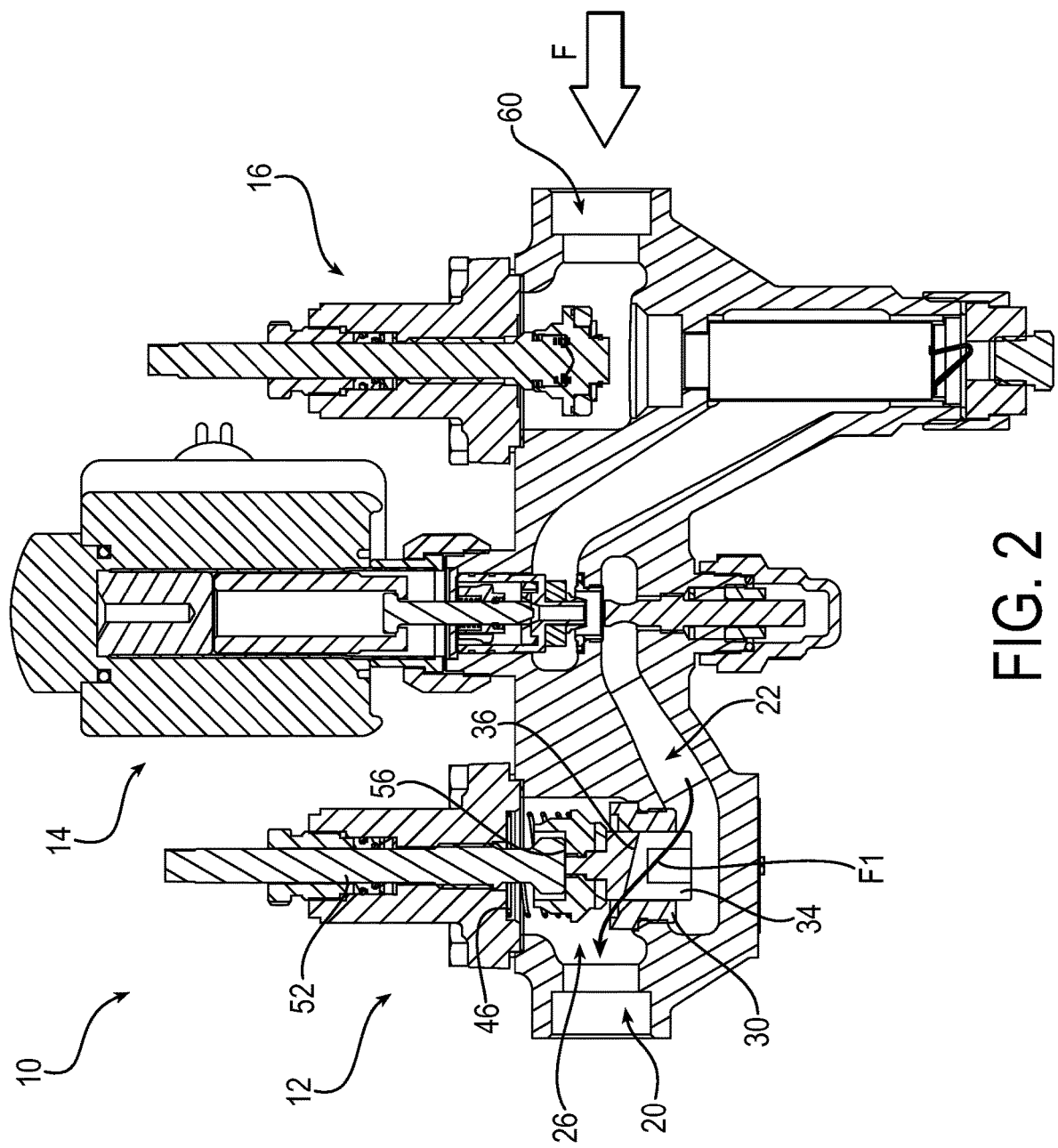
FIG. 2 is a drawing showing a sectional view of the multiport valve of FIG. 1 in a partially open position to enable forward fluid flow through the multiport valve when the solenoid valve and the shutoff valve are in an open position.
Figure 3:
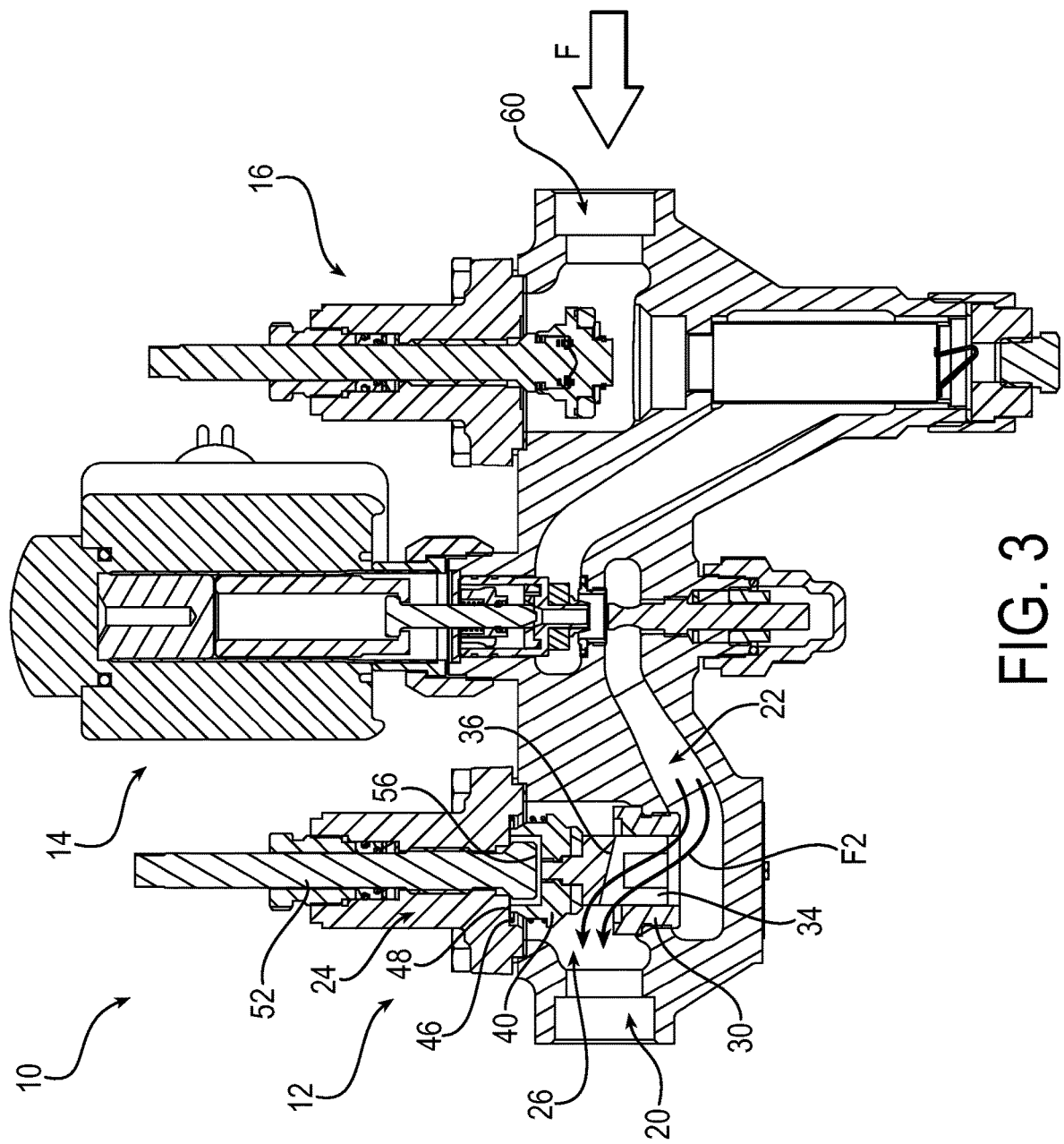
FIG. 3 is a drawing showing a sectional view of the multiport valve of FIG. 1 in a fully open position to enable forward fluid flow through the multiport valve when the solenoid valve and the shutoff valve are in an open position.
Figure 4:
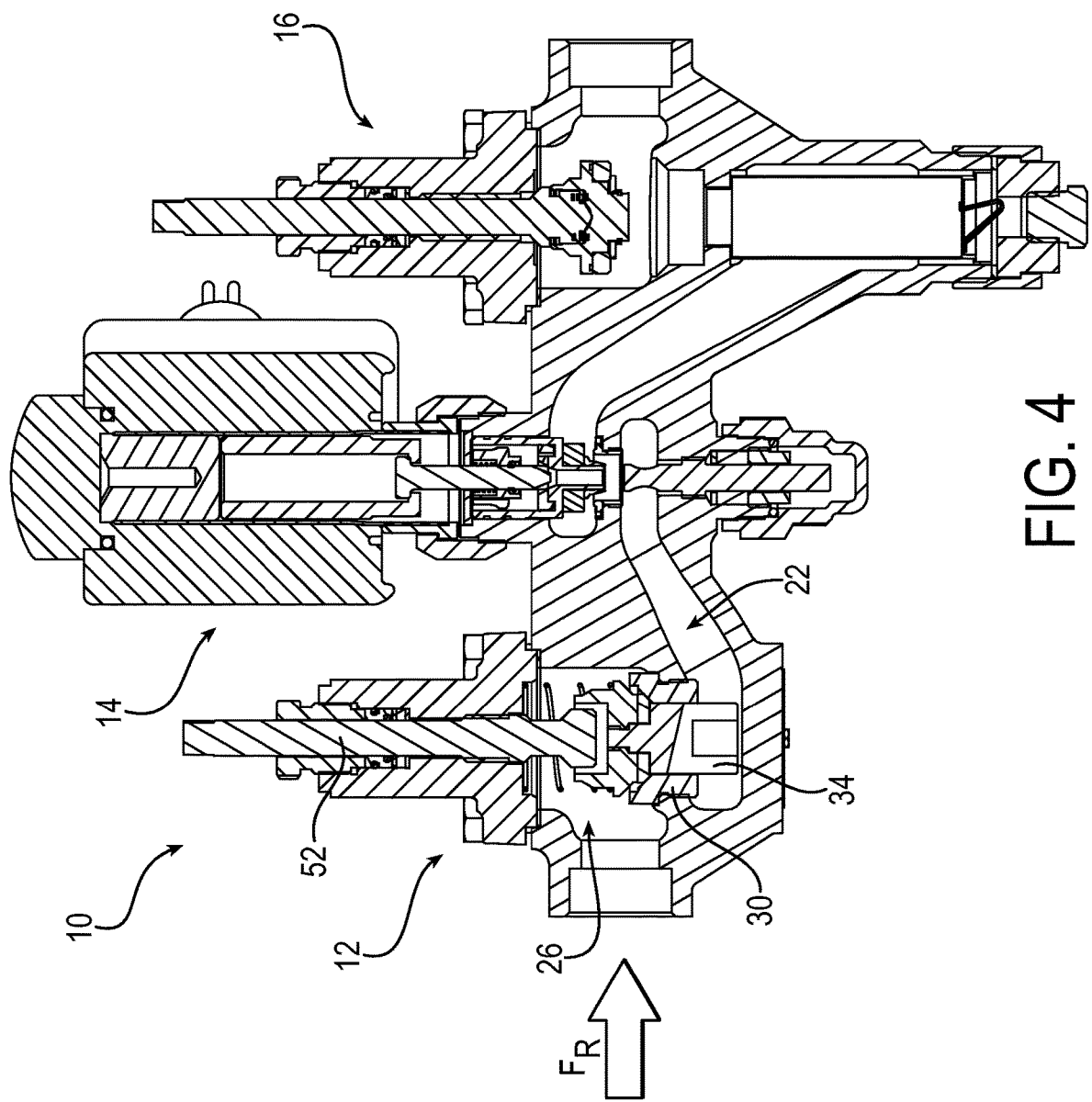
FIG. 4 is a drawing showing a sectional view of the multiport valve of FIG. 1 in a check valve position to prevent reverse fluid flow through the multiport valve when the solenoid valve and the shutoff valve are in an open position.

Referring now to FIGS. 2-4, different operational states of the valve assembly 10 and the multiport valve 12 are shown. FIGS. 2 and 3 shows the valve assembly 10 in an open state in which the multiport valve 12 is open to enable forward fluid flow through the multiport valve 12. The shutoff valve 16 is opened to enable fluid flow F to travel from an inlet port 60 of the shutoff valve 16 to the solenoid valve 14. The solenoid valve 14 is in a powered on position to enable fluid flow through the solenoid valve 14 to the multiport valve 12. Fluid flows through the second fluid port 22 and against a first end or bottom of the piston plug 34 to push the piston plug 34 against the biasing force of the spring 46. The first end of the piston plug 34 may be defined as an end of the piston plug 34 that extends away from the valve stem 52. The piston plug 34 is then axially moved upwardly and away from the annular guide seat 30 to a metering position to enable fluid flow through the annular guide seat 30 to the fluid chamber 26. Metering may be particularly advantageous for controlling flow to an evaporator located downstream relative to the valve assembly 10 in the refrigeration system.

As shown in FIG. 2, the multiport valve 12 is in a partially open position. The valve stem 52 is arranged at a predetermined axial position to limit the axial travel of the piston plug 34, which is engaged against the plug end 56 of the valve stem 52. The valve stem 52 is positioned to enable a low or medium amount of forward fluid flow F1 through the multiport valve 12 by holding the metering slot 36 of the piston plug 34 in fluid communication between the annular guide seat 30 and the second fluid port 22. The piston plug 34 will remain in the metering position of FIG. 2 as long as the multiport valve 12 remains pressurized.

FIG. 3 shows the multiport valve 12 in a fully open position in which the piston plug 34 is in another metering position and a high amount of forward fluid flow F2 is enabled. In the high flow operational state of FIG. 3, the valve stem 52 is moved away from the annular guide seat 30 to another axial position such that the piston plug 34 may axially move a farther distance away from the annular guide seat 30 as compared with the axial position of the valve stem 52 when the multiport valve 12 is in the partially open position of FIG. 2. As shown in FIG. 3, the piston plug 34 may not even engage against the valve stem 52 and may fully compress the spring 46. The travel of the piston plug 34 is limited by engagement between the bottom portion 48 of the bonnet 24 and a top portion of the spring-engaging portion 40 of the piston plug 34. When in the metering position of FIG. 3, the metering slot 36 is moved past the annular guide seat 30 to enable more fluid flow from the second fluid port 22 to the fluid port 20. The piston plug 34 will remain in the metering position of FIG. 3 as long as the multiport valve 12 remains pressurized.

Referring now to FIG. 4, the multiport valve 12 may be closed or moved to a check valve state from the open state of either FIG. 2 or FIG. 3, e.g. from a low fluid flow, medium fluid flow, or high fluid flow operation. The shutoff valve 16 and the solenoid valve 14 may remain open, and the multiport valve 12 is closed to prevent pressurized fluid from being supplied to the first end or bottom of the piston plug 34. If a back pressure remaining in the fluid chamber 26 is greater than the pressure against the bottom of the piston plug 34, the piston plug 34 is pushed down against the annular guide seat 30 to prevent backflow or reverse fluid flow FR through the multiport valve 12 toward the fluid port 22 and the solenoid valve 14, i.e. fluid flow that would flow in an opposite direction relative to the forward fluid flow of FIGS. 2 and 3. Thus, the piston plug 34 acts as a check valve and is moved into a check valve position. As also shown in FIG. 4, the piston plug 34 is moved away from the valve stem 52. The exact position of the valve stem 52 may not be relevant when the piston plug 34 is in the check valve position. The check valve state may be particularly advantageous during a defrost cycle of the refrigeration system.

Figure 5:
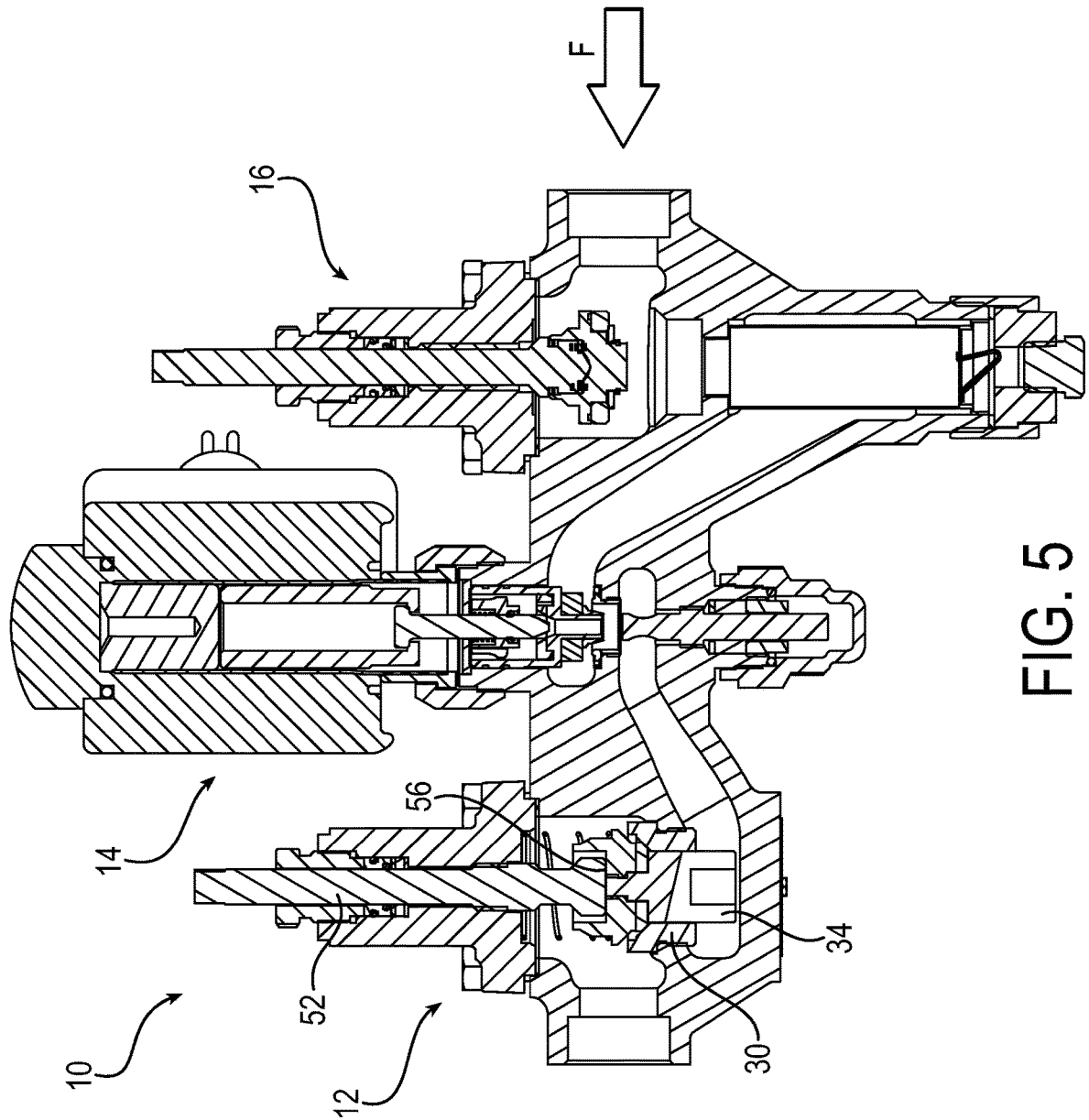
FIG. 5 is a drawing showing a sectional view of the multiport valve of FIG. 1 in a closed position to prevent fluid flow through the multiport valve when the solenoid valve and the shutoff valve are in an open position.

Referring now to FIG. 5, the multiport valve 12 may be moved to a closed state when the solenoid valve 14 and the shutoff valve 16 remain open. Similar to the check valve state of FIG. 4, the piston plug 34 is engaged against the annular guide seat 30 to prevent a forward fluid flow F through the multiport valve 12. The valve stem 52 is then moved to another axial position toward the annular guide seat 30 such that the plug end 56 engages against the top end of the piston plug 34. Using the valve stem 52 is advantageous in tightly sealing the piston plug 34 against the annular guide seat 30. Preventing flow by tightly sealing the valve may be particularly advantageous in isolating the valve assembly from the rest of the refrigeration system and enabling maintenance to be performed on downstream equipment. The closed position of the multiport valve 12 shown in FIG. 5 when the solenoid valve 14 and the shutoff valve 16 are open is similar to the position of the multiport valve 12 shown in FIG. 1 when the solenoid valve 14 and the shutoff valve 16 are closed, i.e. when the entire valve assembly is not operating.

FIG. 6 shows an exemplary embodiment in which the multiport valve 12' is a stand-alone valve as compared with the multiport valve previously described as part of a valve assembly. The stand-alone multiport valve 12' is operable as previously described. The multiport valve 12' includes the annular guide seat 30, the piston plug 34 with the metering slot 36, the plastic annular seat 44, the spring 46, and the valve stem 52 as previously described. The piston plug 34 includes the lift cavity portion 38 and a seat guide portion 62 which axially extends along the annular guide seat 30.

FIGS. 7-9 show exemplary embodiments of the piston plug, respectively denoted 34a, 34b, 34c in the three figures. Using the piston plug in the multiport valve is advantageous in that the piston plug may be removable relative to the rest of the components in the multiport valve without disrupting the rest of the components. A piston plug having a particular metering slot may be selected from a plurality of different piston plugs having different metering slots for meeting the flow demand of a particular application. FIGS. 7-9 show the piston plugs 34a, 34b, 34c having metering slots 36a, 36b, 36c, respectively. The metering slots 36a, 36b, 36c have different opening sizes which are dependent on the desired amount of fluid flow through the multiport valve for a given application. Thus, the multiport valve is modular by enabling different piston plugs 34a, 34b, 34c to be used in the valve.

A valve includes a valve body, a guide seat arranged in the valve body, a piston plug that has a metering slot and is axially movable relative to the guide seat to open and close the valve, and an adjustable valve stem that is axially movable to engage the piston plug. The piston plug is movable between a closed position in which the piston plug is seated against the guide seat and engaged with the valve stem to prevent fluid flow through the valve, a metering position in which the piston plug is moved away from the guide seat and engaged with the valve stem to enable a predetermined amount of forward fluid flow through the valve, and a check valve position in which the piston plug is seated against the guide seat to prevent reverse fluid flow through the valve.

The valve may include a bonnet that is attached to the valve body and in which the valve stem is positioned.

The valve may include a spring that is engageable between the piston plug and the bonnet.

The spring may be engageable against axially extending sides of the piston plug.

The spring may normally bias the piston plug in the closed position.

The metering slot may have a tapered shape.

The piston plug may be formed of two parts that are secured together.

The two parts may each be formed of a metal material.

The valve may include a plastic seat that is removably interposed between the two parts.

The guide seat may be formed of a metal material and the plastic seat is engageable against the guide seat.

The plastic annular seat may be formed of a fluoropolymer material.

Each of the guide seat and the piston plug may be removably separable relative to other components of the valve.

A valve assembly includes a multiport valve having a valve body, a guide seat arranged in the valve body, a piston plug that has a metering slot and is axially movable relative to the guide seat, and an adjustable valve stem that is axially movable to engage the piston plug, a solenoid valve fluidly connected to the multiport valve, and a shutoff valve that is fluidly connected to the solenoid valve and fluidly connected between the multiport valve and the shutoff valve. When the shutoff valve is closed and the solenoid valve is closed, the piston plug is movable to a closed position in which the piston plug is seated against the guide seat and engaged with the valve stem to prevent fluid flow through the multiport valve. When the shutoff valve is open and the solenoid valve is open, the piston plug is movable to a metering position in which the piston plug is moved away from the guide seat and engaged with the valve stem to enable a predetermined amount of forward fluid flow through the multiport valve, and a check valve position in which the piston plug is seated against the guide seat to prevent reverse fluid flow through the multiport valve.

The multiport valve may include a bonnet that is attached to the valve body and in which the valve stem is positioned.

The multiport valve may include a spring that is engageable between the piston plug and the bonnet, wherein the spring normally biases the piston plug in the closed position.

The spring may be engageable against axially extending sides of the piston plug.

The metering slot may have a tapered shape.

The piston plug may be formed of two metal parts that are secured together.

The multiport valve may include a plastic annular seat interposed between the two parts.

The guide seat may be formed of a metal material and the plastic annular seat is engageable against the guide seat.

The plastic annular seat may be formed of a fluoropolymer material.

Each of the guide seat and the piston plug may be removably separable relative to other components of the multiport valve.

A method of controlling fluid flow in a multiport valve includes setting a position of a valve stem to enable a predetermined amount of flow through the multiport valve, supplying a pressurized fluid to a piston plug to move the piston plug away from a guide seat and against the valve stem, wherein movement of the piston plug opens a metering slot of the piston plug to enable the predetermined amount of flow, moving the piston plug against the guide seat when pressurized fluid is no longer supplied to the piston plug to prevent reverse fluid flow through the multiport valve, and adjusting the position of the valve stem to engage the piston plug when the piston plug is seated against the guide seat to close the multiport valve.

The method may include using a biasing spring to bias the piston plug toward the guide seat.

The method may include selecting a piston plug having a predetermined metering slot from a plurality of different piston plugs having different metering slots based on the predetermined amount of flow for the multiport valve.

The method may include axially moving the valve stem through a bonnet attached to a valve body in which the guide seat and the piston plug are arranged.

The method may include removing and replacing the guide seat relative to other components of the multiport valve.

The method may include removing and replacing the piston plug relative to other components of the multiport valve.

The method may include engaging the piston plug with the valve stem when the piston plug is seated against the guide seat to close the multiport valve after closing a shutoff valve and a solenoid valve that are fluidly connected to the multiport valve.

The method may include moving the piston plug away from the guide seat and against the valve stem after opening the shutoff valve and the solenoid valve.

The method may include moving the piston plug to a check valve position in which the piston plug is seated against the guide seat to prevent reverse fluid flow through the multiport valve when the shutoff valve and the solenoid valve are open.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A valve comprising:
   a valve body;
   a guide seat arranged in the valve body;
   a piston plug that has a metering slot and is axially movable relative to the guide seat to open and close the valve; and
   an adjustable valve stem that is axially movable to engage the piston plug,
   wherein the piston plug is movable between a closed position in which the piston plug is seated against the guide seat and engaged with the valve stem to prevent fluid flow through the valve, a metering position in which the piston plug is moved away from the guide seat and engaged with the valve stem to enable a predetermined amount of forward fluid flow through the valve, and a check valve position in which the piston plug is seated against the guide seat to prevent reverse fluid flow through the valve, and
   wherein the piston plug is spaced apart from the adjustable valve stem while in the check valve position;
   the valve further comprising a bonnet that is attached to the valve body and in which the adjustable valve stem is positioned, and a spring that is engageable between the piston plug and the bonnet;
   wherein the spring radially surrounds a portion of the adjustable valve stem, and a spring-engaging end portion of the piston plug defines a recess that receives an end of the adjustable valve stem when the adjustable valve stem engages with the piston plug.

2. The valve according to claim 1, wherein the spring is engageable against axially extending sides of the piston plug, and wherein the spring normally biases the piston plug in the closed position.

3. The valve according to claim 1, wherein the metering slot has a tapered shape.

4. The valve according to claim 1, wherein the piston plug is formed of two metal parts that are secured together.

5. The valve according to claim 4 further comprising a plastic annular seat removably interposed between the two metal parts.

6. The valve according to claim 5, wherein the guide seat is formed of a metal material and the plastic annular seat is engageable against the guide seat.

7. The valve according to claim 5, wherein the plastic annular seat is formed of a fluoropolymer material.

8. The valve according to claim 1, wherein each of the guide seat and the piston plug is removably separable relative to other components of the valve.

9. A method of controlling fluid flow using the valve according to claim 1, the method comprising:
setting a position of the adjustable valve stem to enable the predetermined amount of forward fluid flow through the valve;
supplying a pressurized fluid to the piston plug to move the piston plug away from the guide seat and against the adjustable valve stem, wherein movement of the piston plug opens the metering slot of the piston plug to enable the predetermined amount of forward fluid flow;
moving the piston plug against the guide seat when pressurized fluid is no longer supplied to the piston plug to prevent reverse fluid flow through the valve; and
adjusting the position of the adjustable valve stem to engage the piston plug when the piston plug is seated against the guide seat to close the valve.

10. The method according to claim 9 further comprising selecting the piston plug from a plurality of different piston plugs having different metering slots corresponding to different predetermined flow rates, the selected piston plug having the metering slot from among the different metering slots corresponding to a desired predetermined amount of flow for the valve, and installing the selected piston plug into the valve.

11. The method according to claim 9 further comprising removing and replacing the guide seat and/or the piston plug relative to other components of the valve.

12. A valve assembly comprising:
a multiport valve having a valve body, a guide seat arranged in the valve body, a piston plug that has a metering slot and is axially movable relative to the guide seat, and an adjustable valve stem that is axially movable to engage the piston plug,
a solenoid valve fluidly connected to the multiport valve;
a shutoff valve that is fluidly connected to the solenoid valve; and
the solenoid valve is fluidly connected between the multiport valve and the shutoff valve,
wherein when the shutoff valve is closed and the solenoid valve is closed, the piston plug is movable to a closed position in which the piston plug is seated against the guide seat and engaged with the valve stem to prevent fluid flow through the multiport valve, and
wherein when the shutoff valve is open and the solenoid valve is open, the piston plug is movable to a metering position in which the piston plug is moved away from the guide seat and engaged with the valve stem to enable a predetermined amount of forward fluid flow through the multiport valve, and a check valve position in which the piston plug is seated against the guide seat to prevent reverse fluid flow through the multiport valve, and
wherein the piston plug is spaced apart from the adjustable valve stem while in the check valve position;
the multiport valve further comprising a bonnet that is attached to the valve body and in which the adjustable valve stem is positioned, and a spring that is engageable between the piston plug and the bonnet;
wherein the spring radially surrounds a portion of the adjustable valve stem, and a spring-engaging end portion of the piston plug defines a recess that receives an end of the adjustable valve stem when the adjustable valve stem engages with the piston plug.

13. The valve assembly according to claim 12, wherein the spring is engageable against axially extending sides of the piston plug.

14. The valve assembly according to claim 12, wherein the metering slot has a tapered shape.

15. The valve assembly according to claim 12, wherein the piston plug is formed of two metal parts that are secured together.

16. The valve assembly according to claim 15, wherein the multiport valve includes a plastic annular seat interposed between the two parts, wherein the guide seat is formed of a metal material and the plastic annular seat is engageable against the guide seat.

17. The valve assembly according to claim 12, wherein each of the guide seat and the piston plug is removably separable relative to other components of the multiport valve.

* * * * *